No. 689,175. Patented Dec. 17, 1901.
G. R. FORD.
BOILER CLEANER.
(Application filed Apr. 29, 1901.)
(No Model.)
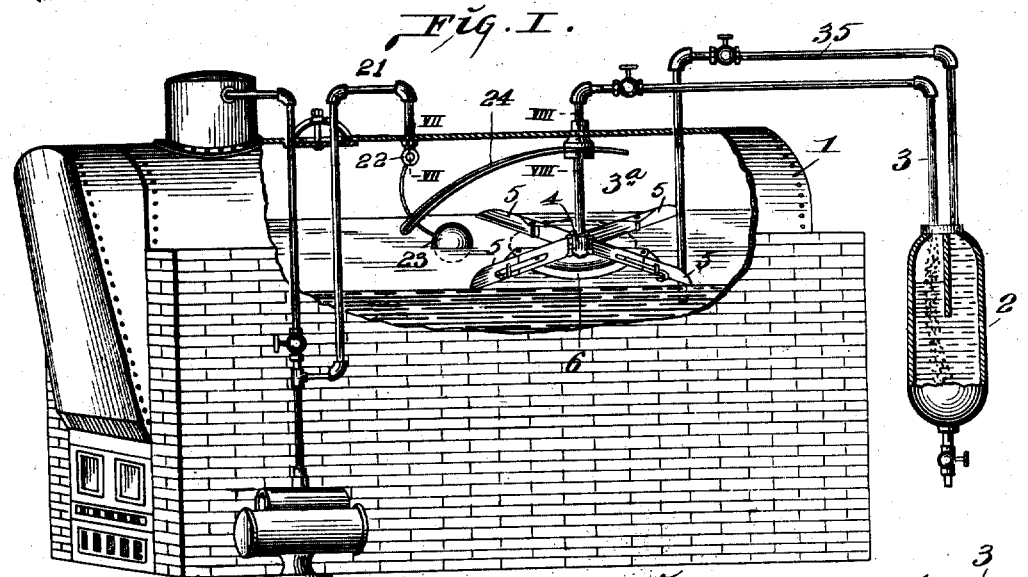
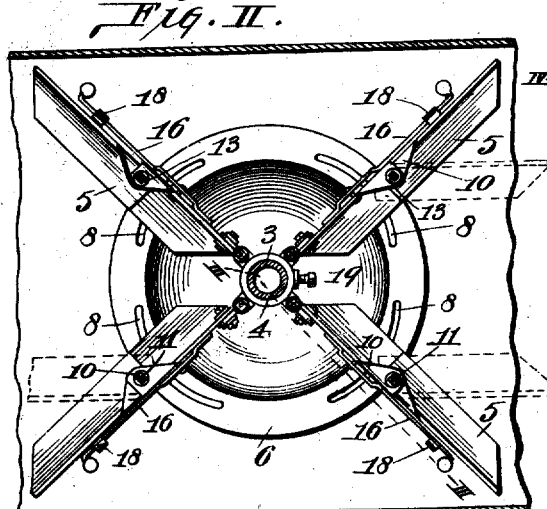
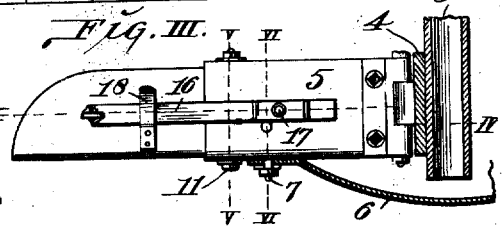
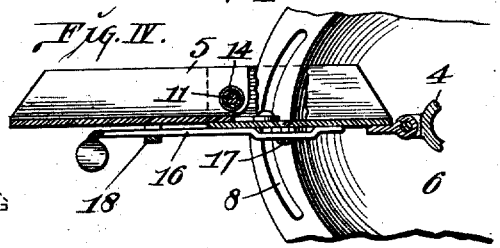
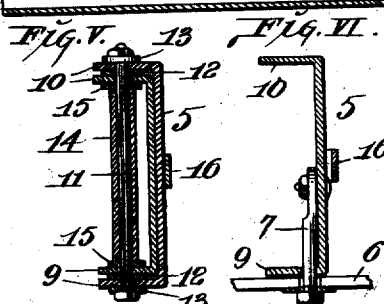
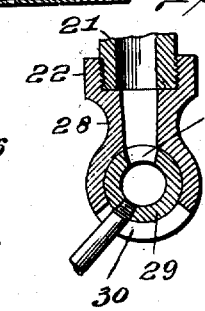
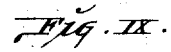
Inventor:
George R. Ford;
By Wright Bros.
Att'y's.
Attest:
M. P. Smith
E. S. Knight

UNITED STATES PATENT OFFICE.

GEORGE R. FORD, OF ST. LOUIS, MISSOURI.

BOILER-CLEANER.

SPECIFICATION forming part of Letters Patent No. 689,175, dated December 17, 1901.

Application filed April 29, 1901. Serial No. 57,853. (No model.)

*To all whom it may concern:*

Be it known that I, GEORGE R. FORD, a citizen of the United States, residing in the city of St. Louis, in the State of Missouri, have invented certain new and useful Improvements in Boiler-Cleaners, of which the following is a full, clear, and exact description, reference being had to the accompanying drawings, forming part of this specification.

My present invention relates to certain improvements in boiler-cleaners, wherein the scum and foreign matter are collected in a saucer or pan, from which they are removed through a pipe to a collecting-tank, the scum and foreign substance being gathered in the pan through the use of arms or wings that radiate from the center of the pan.

My present invention consists in features of novelty hereinafter fully described, and pointed out in the claims.

Figure I is a perspective view of a steam-boiler with my improvement applied. Fig. II is a horizontal section showing part of the shell of a boiler, the radiating wings, and the pan. Fig. III is a detail vertical section taken on line III III, Fig. II. Fig. IV is a detail horizontal section taken on line IV IV, Fig. III. Fig. V is an enlarged vertical section taken on line V V, Fig. III. Fig. VI is an enlarged vertical section taken on line VI VI, Fig. III. Fig. VII is an enlarged detail vertical section of the water-supply valve, this section being taken on line VII VII, Fig. I. Fig. VIII is an enlarged detail vertical section taken on line VIII VIII, Fig. I. Fig. IX is a horizontal section taken on line IX IX, Fig. VIII.

Referring to the drawings, 1 represents a steam-boiler.

2 represents a collecting-tank for receiving scum and foreign substance gathered from the water in the boiler.

3 is a pipe leading from the top of tank 2 to and through the upper part of the boiler and which extends a distance down into the boiler, as shown in Fig. I, its lower end being left open, as shown in Fig. III. Secured to the lower end of the pipe 3 within the boiler is a hub 4, to which are hinged a number of wings or arms 5. I have shown four of these wings. Each wing is made in two sections, and to the inner section of each wing there is secured a pan or saucer 6, the connection between the wings and the saucer being effected by means of bolts 7, (see Fig. VI,) secured to the wings and the lower ends of which fit in slots 8, formed in the outer edge of the saucer, as shown in Fig. IV. By this means of connecting the saucer to the wings the latter can be adjusted on their hinges after being inserted into the boiler and connected to the pipe 3, so that they will bear the proper relation or angle to each other, and then by tightening on the nuts of the bolts 7 the saucer will be supported and the wings will be held to their adjustment. Each wing has a lower horizontal flange 9 and an upper horizontal flange 10. The upper flanges 10 are made short, as their only function is to receive the connecting-bolts, while the lower flanges extend the full length of the wings, so as to assist in conducting the scum and foreign matter to the saucer. The two sections of each wing are connected together by means of a bolt 11 passing through the flanges 9 and 10, as seen in Fig. V. The outer section of each wing is made slightly narrower than the inner section, so that the flanges thereof will fit between the flanges of the inner section and leave room for a washer 12 between each pair of flanges. A washer 13 is also placed between the nut and head, respectively, of the bolt 11 and the flanges of the inner section, and surrounding the bolt 11 between the flanges of the outer section of the wing is a sleeve 14 and washers 15.

In a cleaner of this kind it is very important to provide for the folding up of the wings when an attendant has to enter the boiler for repair purposes in order that he may have room to get around within the boiler. It is extremely difficult to form a hinge to the wings that will not become stuck and useless by the accumulation of lime and foreign matter on the parts. By forming a hinge to the sections in the way that I have described this difficulty, as experience has demonstrated, is not met with and the hinges are always loose, permitting the folding of the sections when desired. The sections of the wings are held extended when the cleaner is in use by means of bars 16, pivoted at 17 to the inner sections of the wings and the outer ends of which are adapted to enter between the outer sections of the wings and straps 18, secured to the sections, as shown in Figs. III and IV.

The hub 4 is held to the pipe 3 by means of a set-screw 19, (see Fig. II,) so that after the wings are introduced into the boiler through the usual manhole they can be readily attached to the pipe 3.

The part 3ª of the pipe 3 which is located within the boiler is made in a separate section from the outer part of the pipe and is connected thereto by a threaded collar 20, (see Fig. VIII,) the collar being located within the boiler.

21 represents the steam-pipe to the feed-water pump, and for the purpose of controlling the passage of steam to the pump through this pipe I employ a valve 22 and a float 23. In order to keep the float from contacting with the boiler-tubes, I use a yoke 24, that straddles the stem of the float, as seen in Fig. I. The yoke is supported by the collar 20, to which it is clamped by a nut 25, (see Fig. VIII,) having a threaded connection with the reduced portion 26 of the collar 20. Between the nut and the arms of the yoke is a washer 27, the upper edge of which is grooved to receive the arms of the yoke, so that as the nut is tightened up the arms will not be liable to spring outwardly from beneath the collar 20.

The valve 22 (see Fig. VII) is composed of a housing 28, tapped onto the inner end of the pipe 21 and within which fits a rotary hollow tube or barrel 29, to which the stem of the float is connected, the stem fitting in a slot 30 in the housing, so as to permit it to rise and fall with the water in the boiler. The barrel 29 has an opening 31, which when registering with the vertical opening in the housing forms a communication between the pipe 21 and the boiler, so that the steam can pass from the boiler through the vertical opening in the housing and through the pipe 21 to the pump. As the water rises in the boiler the elevation of the float turns the barrel 29 so as to move the opening 31 out of registration with the opening in the housing, thus closing off the passage of steam through the pipe 21 until the float falls again and opens up the communication.

35 represents a return-pipe through which water may pass back from the tank 2 to the boiler.

I claim as my invention—

1. In a boiler-cleaner, the combination of a discharge-pipe, a hub secured to the pipe, wings radiating from the hub, and a saucer secured to the wings; each of said wings being made in sections hinged together about midway of its length so as to be folded in a horizontal plane to shorten its length within the boiler, substantially as set forth.

2. In a boiler-cleaner, the combination of a discharge-pipe, wings radiating from the pipe, and a saucer located beneath the wings; each of said wings being made in sections hinged together about midway of its length so as to be folded in a horizontal plane to shorten its length within the boiler, substantially as set forth.

3. In a boiler-cleaner, the combination of a discharge-pipe, wings radiating from the pipe, and a saucer located beneath the pipe; said wings being made in sections connected together by hinges consisting of a vertical bolt passing through flanges on the sections, a sleeve surrounding the bolt, and washers 12, 13 and 15 located as and for the purpose set forth.

4. In a boiler-cleaner, the combination of a discharge-pipe, wings radiating from the pipe and secured thereto, and a saucer located beneath said pipe and wings and connected to the latter by means of bolts 7 secured to the wings and which pass through slots in the saucer, substantially as set forth.

5. In a boiler-cleaner, the combination of a discharge-pipe, wings hinged to the pipe within the boiler, and a saucer secured to the wings; said wings being made in sections hinged together by bolts passing through wings formed on the sections, the inner sections of the wings being provided with pivoted bars and the outer sections of the wings having straps to receive the bars, substantially as and for the purpose set forth.

6. In a boiler-cleaner, the combination of a discharge-pipe, wings and a saucer located at the open lower end of the pipe, a steam-pipe leading to a feed-water pump, a float and valve controlling the passage of steam through the last-mentioned pipe to the pump, and a yoke for holding the float out of contact with the boiler-tubes; said yoke being secured to said discharge-pipe by means of a collar, a nut threaded onto the collar, and a grooved washer located between the nut and the arms of the yoke, substantially as set forth.

GEORGE R. FORD.

In presence of—
E. S. KNIGHT,
M. P. SMITH.